US012111017B2

(12) United States Patent
Yamamoto et al.

(10) Patent No.: US 12,111,017 B2
(45) Date of Patent: Oct. 8, 2024

(54) FILLING MODULE AND VEHICLE

(71) Applicant: TOYOTA JIDOSHA KABUSHIKI KAISHA, Toyota (JP)

(72) Inventors: Shota Yamamoto, Toyota (JP); Toshiyuki Tonuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 18/191,079

(22) Filed: Mar. 28, 2023

(65) Prior Publication Data
US 2023/0341091 A1 Oct. 26, 2023

(30) Foreign Application Priority Data

Apr. 21, 2022 (JP) .................................. 2022-070048

(51) Int. Cl.
*F17C 5/00* (2006.01)
*B67D 7/04* (2010.01)

(52) U.S. Cl.
CPC ................ *F17C 5/007* (2013.01); *B67D 7/04* (2013.01); *B67D 2007/0444* (2013.01); *F17C 2205/037* (2013.01); *F17C 2221/012* (2013.01); *F17C 2221/033* (2013.01); *F17C 2221/035* (2013.01); *F17C 2265/065* (2013.01); *F17C 2270/0178* (2013.01); *F17C 2270/0184* (2013.01)

(58) Field of Classification Search
CPC .... B67D 7/00; B67D 7/04; B67D 2007/0474; B67D 2007/0444; B67D 2007/0426
See application file for complete search history.

(56) References Cited

U.S. PATENT DOCUMENTS 8,684,044 B2 * 4/2014 Saiki ......................... C01B 3/00
141/4
9,735,439 B2 * 8/2017 Kawaura ................ B60L 50/72
2017/0187056 A1 6/2017 Kawaura et al.

FOREIGN PATENT DOCUMENTS

JP 2017118694 A 6/2017
WO WO-2011092561 A1 * 8/2011 ............ F17C 13/025

* cited by examiner

*Primary Examiner* — Timothy L Maust
(74) *Attorney, Agent, or Firm* — Dickinson Wright, PLLC

(57) ABSTRACT

The filling module includes: a first receptacle to be coupled to a first filling nozzle on a gas station side; a second receptacle to be coupled to a second filling nozzle on the gas station side; a first transmitter to transmit infrared rays to a first receiver disposed on an end portion of the first filling nozzle, the first transmitter being provided near the first receptacle; a second transmitter to transmit infrared rays to a second receiver disposed on an end portion of the second filling nozzle, the second transmitter being provided near the second receptacle; and first and second screen portions that project toward the gas station, the first and second screen portions being provided between the first transmitter and the second transmitter.

9 Claims, 4 Drawing Sheets

FILLING MODULE AND VEHICLE

CROSS REFERENCE TO RELATED APPLICATIONS

The present application claims priority from Japanese patent application JP 2022-070048 filed on Apr. 21, 2022, the entire content of which is hereby incorporated by reference into this application.

BACKGROUND

Technical Field

The present disclosure relates to a filling module for filling a tank mounted on a vehicle or the like with fuel gas, and a vehicle provided with the filling module.

Background Art

Recently, a vehicle installed with a fuel cell that uses an electrochemical reaction between fuel gas and oxidizing gas to generate power has been developed for practical use. As described in JP 2017-118694 A, for example, this type of vehicle includes a receptacle as a fuel gas filling port, and connects the receptacle to a filling nozzle disposed on a gas station side so as to fill a tank mounted on the vehicle with fuel gas. To safely conduct the fuel gas filling operation, the vehicle is configured to perform wireless communication between the receptacle and the filling nozzle. Specifically, a transmitter for transmitting infrared rays is provided near the receptacle and a receiver for receiving the infrared rays is provided on the end portion of the filling nozzle. Using the transmitter and the receiver, the vehicle transmits, to the gas station, information such as a supply amount and a supply rate of the fuel gas to be supplied to the tank, and a controller on the gas station side controls the supply amount and the supply rate of the fuel gas based on the received information.

SUMMARY

For widespread use of the vehicle installed with a fuel cell and improvement of its quality, the ability to fill with fuel gas in a short period of time is required. To achieve this, it is considered to provide, for example, two filling nozzles on the gas station side and two receptacles on the vehicle side and use these filling nozzles and receptacles to simultaneously fill the tank with the fuel gas. That is, one receptacle on the vehicle side and one filling nozzle on the gas station side form a pair, and two such pairs are prepared for simultaneous filling with fuel gas. In this case, in each pair, a transmitter is provided on the receptacle and a receiver is provided on the filling nozzle to transmit and receive filling information in each pair.

In addition, for modularization of components and for downsizing of the vehicle, two receptacles are intended to be arranged adjacent to each other. However, due to a relatively wide range (for example, a fan shape with a central angle of 110°) of infrared rays transmitted by the transmitter, such adjacent arrangement of the two receptacles may cause the infrared rays transmitted by the transmitter on one of the receptacles to enter the receiver on the filling nozzle coupled to the other one of the receptacles, and interference may occur.

The present disclosure has been made in view of the foregoing, and provides a filling module and a vehicle provided with the filling module capable of preventing interference even when two receptacles are disposed adjacent to each other.

The filling module according to the present disclosure is a filling module for filling a tank with fuel gas, including: a first receptacle configured to be coupled to a first filling nozzle disposed on a gas station side; a second receptacle configured to be coupled to a second filling nozzle disposed on the gas station side, the second receptacle being adjacent to the first receptacle; a first transmitter configured to transmit infrared rays to a first receiver disposed on an end portion of the first filling nozzle, the first transmitter being provided near the first receptacle; a second transmitter configured to transmit infrared rays to a second receiver disposed on an end portion of the second filling nozzle, the second transmitter being provided near the second receptacle; and a screen portion that projects toward the gas station, the screen portion being provided between the first transmitter and the second transmitter. In the projection direction of the screen portion, an end of the screen portion projects farther than an end of at least one of the first transmitter or the second transmitter.

In the filling module according to the present disclosure, the screen portion provided between the first transmitter and the second transmitter projects toward the gas station, and the end of the screen portion projects farther than the end of at least one of the first transmitter or the second transmitter. The screen portion can prevent the infrared rays transmitted by the first transmitter provided near the first receptacle from entering the second receiver on the end portion of the second filling nozzle coupled to the second receptacle or prevent the infrared rays transmitted by the second transmitter provided near the second receptacle from entering the first receiver on the end portion of the first filling nozzle coupled to the first receptacle. Consequently, even when the two receptacles (i.e., the first receptacle and the second receptacle) are disposed adjacent to each other, interference can be avoided.

In the filling module according to the present disclosure, in the projection direction of the screen portion, the end of the screen portion may project farther than a straight line connecting the end of the first transmitter and the second receiver of the second filling nozzle in a state of being coupled to the second receptacle or a straight line connecting the end of the second transmitter and the first receiver of the first filling nozzle in a state of being coupled to the first receptacle.

With such a configuration, it is possible to more surely prevent the infrared rays transmitted by the first transmitter provided near the first receptacle from entering the second receiver on the end portion of the second filling nozzle coupled to the second receptacle or prevent the infrared rays transmitted by the second transmitter provided near the second receptacle from entering the first receiver on the end portion of the first filling nozzle coupled to the first receptacle. Thus, it is possible to increase the effect of preventing interference.

In the filling module according to the present disclosure, the screen portion may include a first screen portion located relatively close to the first receptacle and a second screen portion located relatively close to the second receptacle, and when the first filling nozzle and the second filling nozzle are each formed in a cylindrical shape having a filling passage at the center of the first filling nozzle and the center of the second filling nozzle, a side surface of the first screen portion facing the first receptacle may have an arc shape following the shape of the first filling nozzle and a side surface of the second screen portion facing the second receptacle may have an arc shape following the shape of the second filling nozzle.

With such a configuration, since the first screen portion guides the first filling nozzle using its arc-shaped side surface, it is possible to more smoothly couple the first filling nozzle to the first receptacle and to prevent the first filling nozzle from interfering with the second receptacle adjacent to the first receptacle. Similarly, since the second screen portion guides the second filling nozzle using its arc-shaped side surface, it is possible to more smoothly couple the second filling nozzle to the second receptacle and to prevent the second filling nozzle from interfering with the first receptacle adjacent to the second receptacle.

The filling module according to the present disclosure may further include a first cap detachably attached to the first receptacle and a second cap detachably attached to the second receptacle, and the closest distance between the first screen portion and the second screen portion may be smaller than an outside diameter of the first cap and an outside diameter of the second cap.

With such a configuration, since the first cap or the second cap can be placed on a clearance generated between the first screen portion and the second screen portion, it is possible to ensure a space for placement of the first cap or the second cap. Accordingly, one of the first cap or the second cap as detached can be placed on the space provided in the filling lid box as conventionally, and the other one of the first cap or the second cap as detached can be placed on the clearance generated between the first screen portion and the second screen portion. Consequently, it is possible to prevent the first cap or the second cap with no placement space from interfering with the vehicle body, and to reduce the likelihood that the first cap or the second cap with no placement space will hinder the coupling operation.

In the filling module according to the present disclosure, the side surface having an arc shape of the first screen portion facing the first receptacle and the side surface having an arc shape of the second screen portion facing the second receptacle may be each covered with resin.

With such a configuration, even if the first filling nozzle comes into contact with the first screen portion and the second filling nozzle comes into contact with the second screen portion, it is possible to reduce damage to the first filling nozzle or the second filling nozzle caused by such contact.

In the filling module according to the present disclosure, the screen portion includes one screen portion, and when the first filling nozzle and the second filling nozzle are each formed in a cylindrical shape having a filling passage at the center of the first filling nozzle and the center of the second filling nozzle, a side surface of the screen portion facing the first receptacle may have an arc shape following the shape of the first filling nozzle and a side surface of the screen portion facing the second receptacle may have an arc shape following the shape of the second filling nozzle.

With such a configuration, since the screen portion guides the first filling nozzle using its arc-shaped side surface facing the first receptacle, it is possible to more smoothly couple the first filling nozzle to the first receptacle and to prevent the first filling nozzle from interfering with the second receptacle adjacent to the first receptacle. In addition, since the screen portion guides the second filling nozzle using its arc-shaped side surface facing the second receptacle, it is possible to more smoothly couple the second filling nozzle to the second receptacle and to prevent the second filling nozzle from interfering with the first receptacle adjacent to the second receptacle.

The filling module according to the present disclosure is a filling module for filling a tank with fuel gas, including: a first receptacle configured to be coupled to a first filling nozzle disposed on a gas station side; a second receptacle configured to be coupled to a second filling nozzle disposed on the gas station side, the second receptacle being adjacent to the first receptacle; a first receiver configured to receive infrared rays transmitted by a first transmitter disposed on an end portion of the first filling nozzle, the first receiver being provided near the first receptacle; a second receiver configured to receive infrared rays transmitted by a second transmitter disposed on an end portion of the second filling nozzle, the second receiver being provided near the second receptacle; and a screen portion that projects toward the gas station, the screen portion being provided between the first receiver and the second receiver. In the projection direction of the screen portion, an end of the screen portion projects farther than an end of at least one of the first receiver or the second receiver.

In the filling module according to the present disclosure, the screen portion provided between the first receiver and the second receiver projects toward the gas station, and the end of the screen portion projects farther than the end of at least one of the first receiver or the second receiver. The screen portion can prevent the infrared rays transmitted by the first transmitter disposed on an end portion of the first filling nozzle coupled to the first receptacle from entering the second receiver provided near the second receptacle or prevent the infrared rays transmitted by the second transmitter disposed on an end portion of the second filling nozzle coupled to the second receptacle from entering the first receiver provided near the first receptacle. Consequently, even when the two receptacles (i.e., the first receptacle and the second receptacle) are disposed adjacent to each other, interference can be avoided.

Furthermore, a vehicle according to the present disclosure includes the above-stated filling module. With such a configuration, since interference can be avoided, it is possible to more accurately conduct the fuel gas filling operation in a shorter time.

According to the present disclosure, even when two receptacles are disposed adjacent to each other, interference can be avoided.

DETAILED DESCRIPTION

The following describes some embodiments of the filling module and the vehicle according to the present disclosure, with reference to the drawings. In the description of the drawings, identical elements are denoted by identical reference signs, and repeated description thereof will be omitted. In the following descriptions, upper, lower, left, right, front and rear directions and positions are based on the vehicle provided with the filling module.

First Embodiment

Figure 1:
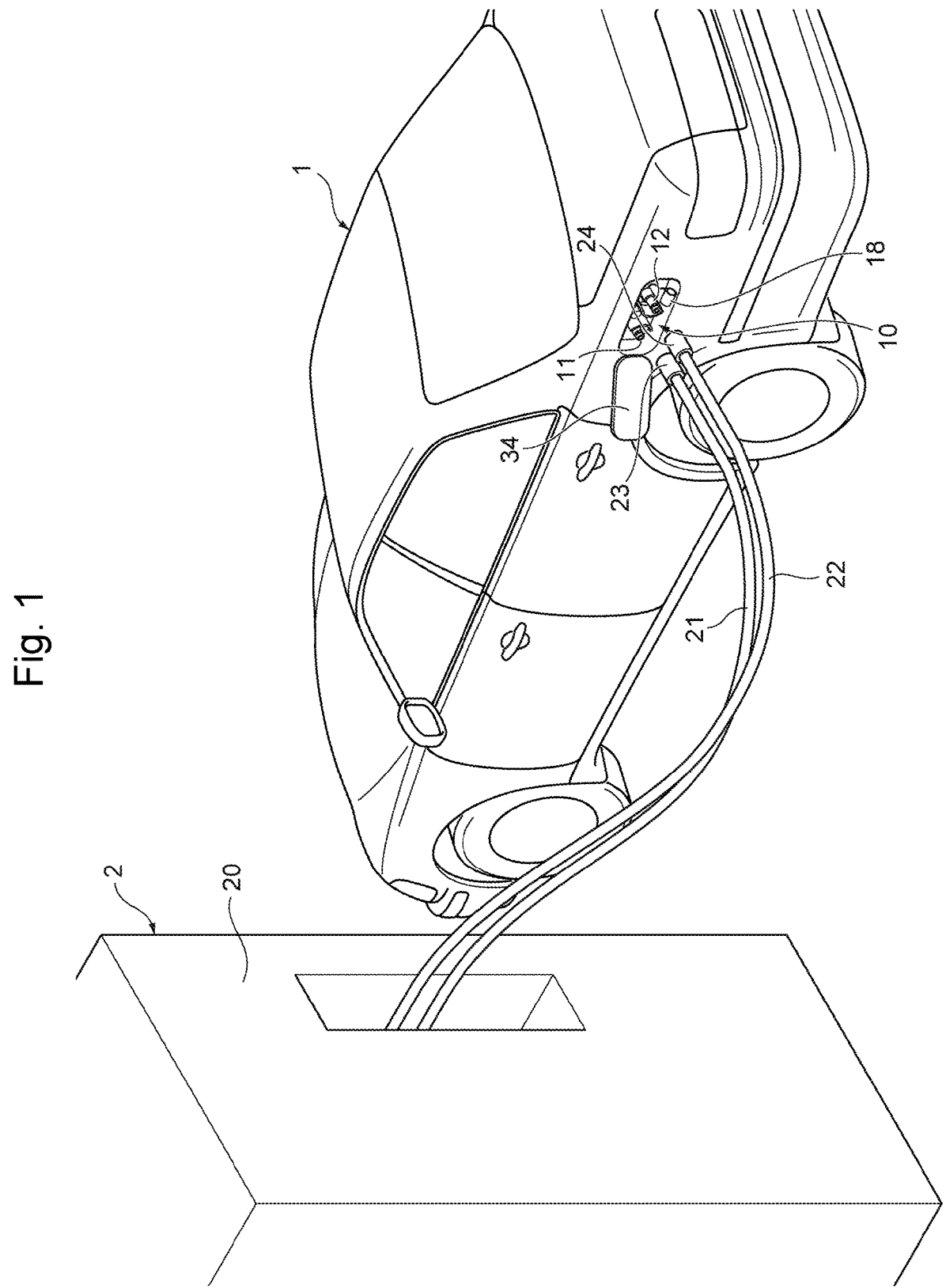
FIG. 1 is a perspective view of a vehicle and a gas station.

FIG. 1 is a perspective view showing a vehicle and a gas station. As shown in FIG. 1, a vehicle 1 is, for example, a fuel cell vehicle that is configured to be filled with fuel gas (herein, hydrogen gas) from a gas station 2 while performing infrared communication with the gas station 2. Note that the fuel gas is not limited to the hydrogen gas, and may be other types of gases such as compressed natural gas (CNG), liquefied natural gas (LNG), liquefied petroleum gas (LPG) or the like.

The gas station 2 is, for example, an on-site type hydrogen station that is a device for supplying compressed hydrogen gas (i.e., for filling hydrogen gas) to a vehicle such as a fuel cell automobile or a fuel cell bus. To achieve hydrogen filling of the vehicle 1 or the like in a short period of time, the gas station 2 includes a body portion 20 in which a storage tank that stores hydrogen gas therein is disposed, two hoses (a first hose 21 and a second hose 22) coupled to the storage tank at their respective ends, and filling nozzles (a first filling nozzle 23 and a second filling nozzle 24) respectively coupled to the other ends of the two hoses. In this example, the first filling nozzle 23 is coupled to the end of the first hose 21 and the second filling nozzle 24 is coupled to the end of the second hose 22. The first filling nozzle 23 and the second filling nozzle 24 are each formed in a cylindrical shape having a filling passage at their centers.

Figure 3:
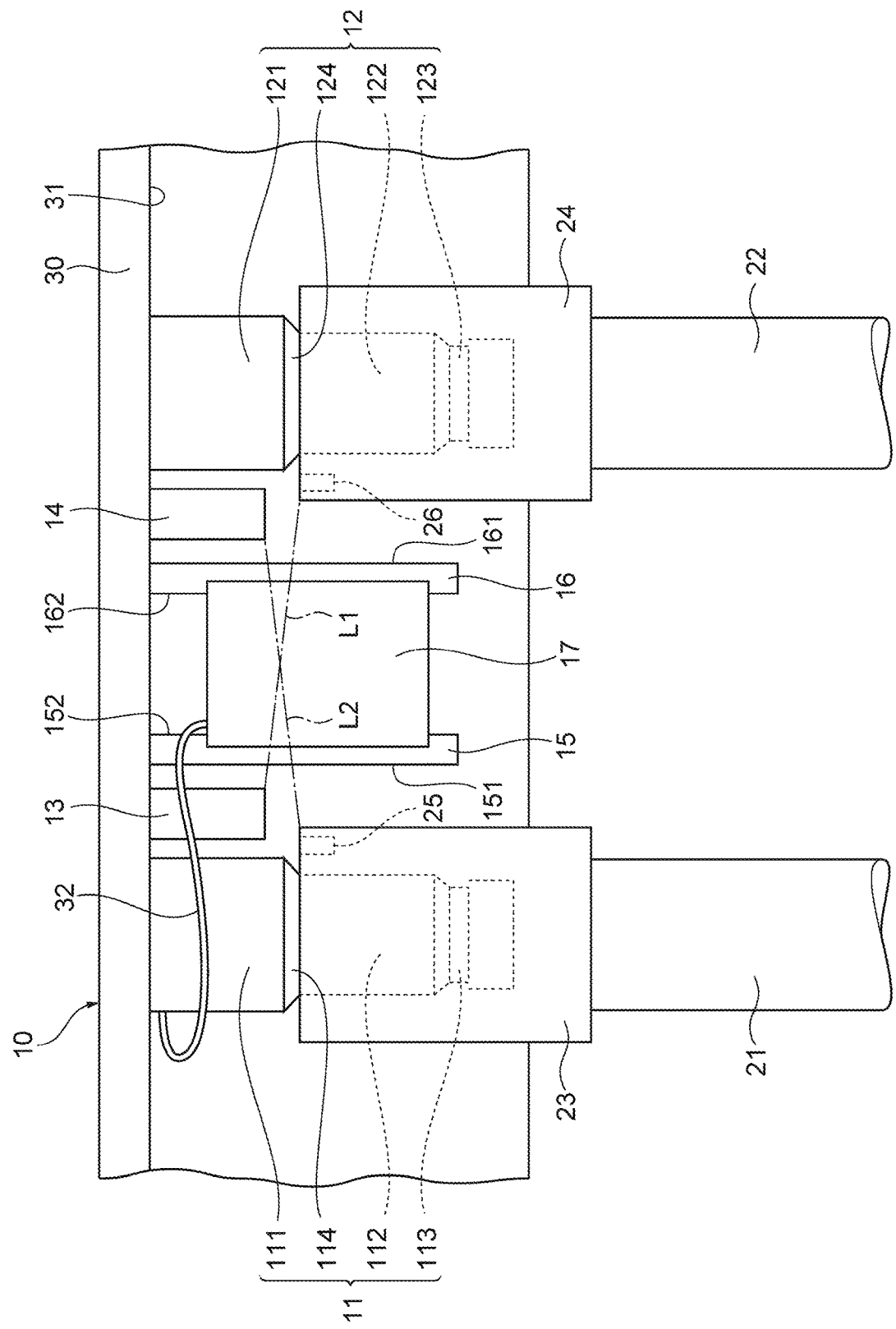
FIG. 3 is a plan view of the filling module according to the first embodiment showing the state where a first filling nozzle and a second filling nozzle are coupled thereto.

In addition, to safely conduct the hydrogen gas filling operation, infrared communication is performed between the gas station 2 and the vehicle 1. Specifically, as shown in FIG. 3 which will be described later, the end portion of the first filling nozzle 23 is provided with a first receiver 25 for receiving infrared rays transmitted by a first transmitter 13 on the vehicle 1 side and the end portion of the second filling nozzle 24 is provided with a second receiver 26 for receiving infrared rays transmitted by a second transmitter 14 on the vehicle 1 side. The first receiver 25 is embedded in the end portion of the first filling nozzle 23 such that its end surface is flush with the end surface of the first filling nozzle 23, for example. Similarly, the second receiver 26 is embedded in the end portion of the second filling nozzle 24 such that its end surface is flush with the end surface of the second filling nozzle 24.

Then, the gas station 2 grasps the state of coupling of the first filling nozzle 23 to the first receptacle 1 on the vehicle 1 side using the first transmitter 13 and the first receiver 25 and the state of coupling of the second filling nozzle 24 to the second receptacle 12 on the vehicle 1 side using the second transmitter 14 and the second receiver 26. Using these transmitters and receivers, the gas station 2 acquires information such as a supply amount and a supply rate of the hydrogen gas. A controller on the gas station 2 side controls each filling operation based on the acquired information.

The vehicle 1 is provided with a filling module 10. The filling module 10 is a module for filling a tank mounted on the vehicle 1 with hydrogen gas, a so-called filling lid box. This filling module 10 is attached to the left side surface of the rear part of the vehicle 1, for example, and is covered by a filling lid 34 provided to be rotatable on the vehicle body.

Figure 2:
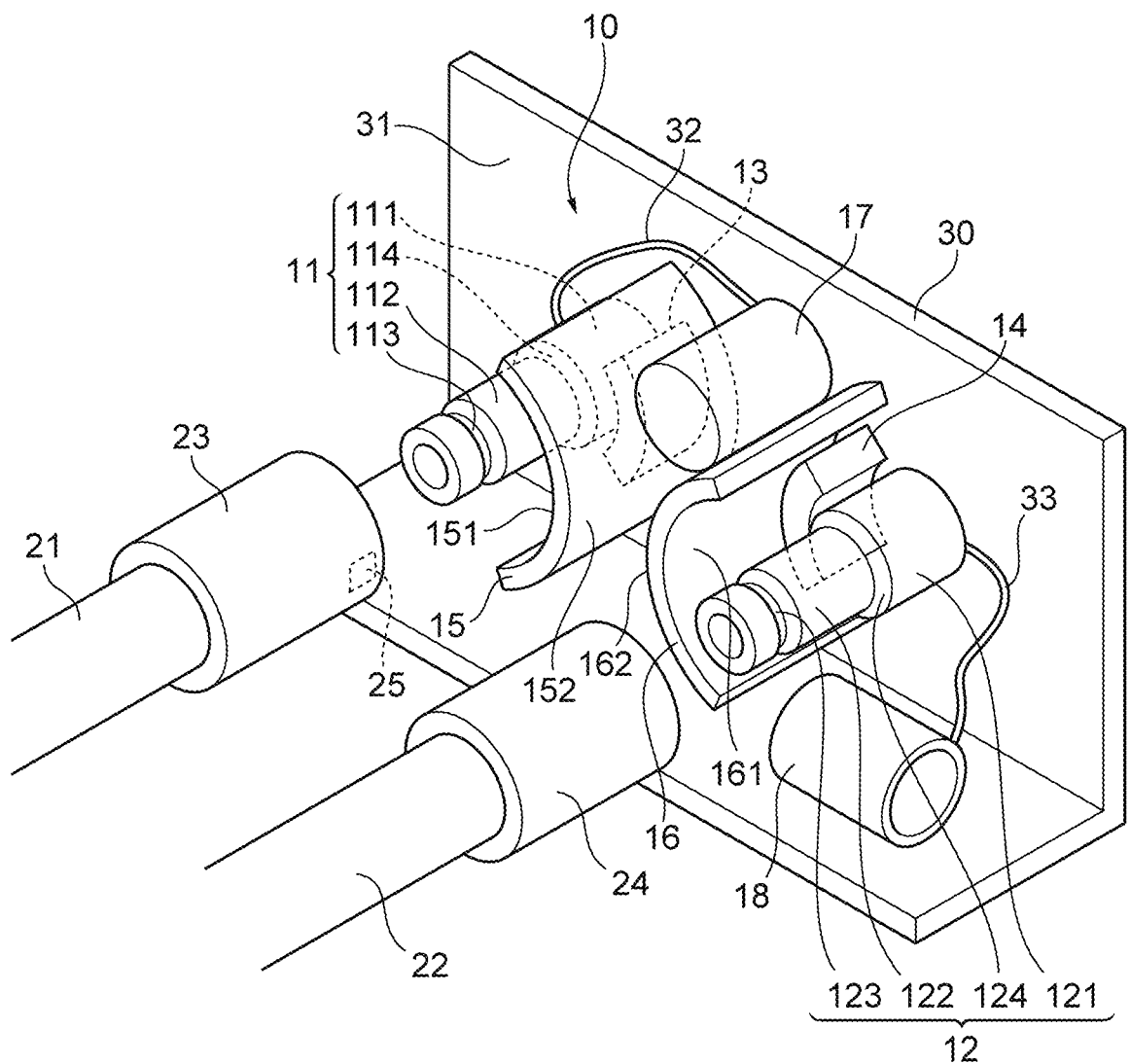
FIG. 2 is a perspective view of a filling module according to a first embodiment.

FIG. 2 is a perspective view of the filling module according to the first embodiment. FIG. 3 is a plan view of the filling module according to the first embodiment showing the state where the first filling nozzle and the second filling nozzle are coupled thereto. The filling module 10 of the present embodiment mainly includes the first receptacle 11 and the second receptacle 12 that are adjacent to each other, the first transmitter 13 provided near the first receptacle 11, and the second transmitter 14 provided near the second receptacle 12.

The first receptacle 11 and the second receptacle 12 are members serving as hydrogen gas filling ports on the vehicle 1 side, and are formed of metal material in the same cylindrical shape and size, for example, and fixed to a panel member 30 that is joined to the vehicle body. More specifically, the first receptacle 11 and the second receptacle 12 are disposed side by side on an outer wall surface 31 of the panel member 30 along the front-rear direction of the vehicle 1 and project outwardly (toward the gas station 2) of the vehicle 1 from the outer wall surface 31 (see FIG. 1).

The first receptacle 11 is formed to be couplable to the first filling nozzle 23 on the gas station 2 side and the second receptacle 12 is formed to be couplable to the second filling nozzle 24 on the gas station 2 side. That is, the first receptacle 11 corresponds to the first filling nozzle 23 on the gas station 2 side and is paired with the first filling nozzle 23. The second receptacle 12 corresponds to the second filling nozzle 24 on the gas station 2 side and is paired with the second filling nozzle 24.

The coupling of the first receptacle 11 to the first filling nozzle 23 is achieved using a ball-lock mechanism, for example. For example, the end portion of the first filling nozzle 23 is provided with a locking ball, and the first receptacle 11 is provided with an engaging groove that engages with the locking ball. Similarly, the coupling of the second receptacle 12 to the second filling nozzle 24 is also achieved using a ball-lock mechanism.

As shown in FIG. 2 and FIG. 3, the first receptacle 11 includes a large-diameter portion 111 having a relatively large outside diameter and fixed to the panel member 30 and a small-diameter portion 112 having a relatively small outside diameter and integrally formed with the large-diameter portion 111. On the outer periphery of the end portion of the small-diameter portion 112, an engaging groove 113 having a semi-circular cross section that can be engaged with the locking ball provided on the first filling nozzle 23 side is formed across the entire periphery. In addition, a tapered stepped surface 114 is formed between the small-diameter portion 112 and the large-diameter portion 111. When coupling the first receptacle 11 to the first filling nozzle 23, this stepped surface 114 serves as an abutting stepped surface that abuts on the end surface of the first filling nozzle 23.

Similarly, the second receptacle 12 includes a large-diameter portion 121 having a relatively large outside diameter and fixed to the panel member 30 and a small-diameter portion 122 having a relatively small outside diameter and integrally formed with the large-diameter portion 121. On the outer periphery of the end portion of the small-diameter portion 122, an engaging groove 123 having a semi-circular cross section that can be engaged with the locking ball provided on the second filling nozzle 24 side is formed across the entire periphery. In addition, a tapered stepped surface 124 is formed between the small-diameter portion 122 and the large-diameter portion 121. When coupling the second receptacle 12 to the second filling nozzle 24, this stepped surface 124 serves as an abutting stepped surface that abuts on the end surface of the second filling nozzle 24.

The first transmitter 13 is disposed between the first receptacle 11 and the second receptacle 12 at a location close to the first receptacle 11. As viewed inwardly from the outside of the vehicle 1, the first transmitter 13 is formed to have a fan-shaped annular cross section. This first transmitter 13 is attached to the outer wall surface 31 of the panel member 30 and transmits infrared rays toward the first receiver 25 disposed on the end portion of the first filling nozzle 23.

The second transmitter 14 is disposed between the first receptacle 11 and the second receptacle 12 at a location close to the second receptacle 12. As viewed inwardly from the outside of the vehicle 1, the second transmitter 14 is formed to have a fan-shaped annular cross section. This second transmitter 14 is attached to the outer wall surface 31 of the panel member 30 and transmits infrared rays toward the second receiver 26 disposed on the end portion of the second filling nozzle 24.

In addition, two screen portions (a first screen portion 15 and a second screen portion 16) projecting outwardly of the vehicle 1 (toward the gas station 2) are provided between the first transmitter 13 and the second transmitter 14.

The first screen portion 15 is disposed between the first transmitter 13 and the second transmitter 14 at a location relatively close to the first transmitter 13 such that the infrared rays transmitted by the first transmitter 13 will not enter the second receiver 26 on the end portion of the second filling nozzle 24 coupled to the second receptacle 12. This first screen portion 15 is provided upright on the outer wall surface 31 of the panel member 30.

As shown in FIG. 2, as viewed inwardly from the outside of the vehicle 1, the first screen portion 15 is formed to have a fan-shaped annular cross section along the outer periphery of the first transmitter 13. Specifically, an inner side surface 151 of the first screen portion 15 facing the first receptacle 11 has an arc shape following the shape of the first filling nozzle 23 that is to be coupled to the first receptacle 11. The distance between the inner side surface 151 and the first receptacle 11 is set so as not to hinder the insertion of the first filling nozzle 23 when coupling the first filling nozzle 23 to the first receptacle 11. In addition, an outer side surface 152 opposite to the inner side surface 151 also has an arc shape. It should be noted that the shape of the first screen portion 15 is not limited to the fan-shaped annular cross section, and may be, for example, a crescent-shaped cross section.

In addition, as shown in FIG. 3, the end of the of the first screen portion 15 projects farther than the end of the first transmitter 13 in the projection direction of the first screen portion 15. Here, in the projection direction of the first screen portion 15, the end of the first screen portion 15 may project farther than a straight line L1 connecting the end of the first transmitter 13 and the second receiver 26 of the second filling nozzle 24 in a state of being coupled to the second receptacle 12. More specifically, the straight line L1 is a line connecting the center of the end of the first transmitter 13 and the center of the second receiver 26 in a state where the second receptacle 12 and the second filling nozzle 24 are coupled to each other, for example.

The second screen portion 16 is disposed between the first transmitter 13 and the second transmitter 14 at a location relatively close to the second transmitter 14 such that the infrared rays transmitted by the second transmitter 14 will not enter the first receiver 25 on the end portion of the first filling nozzle 23 coupled to the first receptacle 11. This second screen portion 16 is provided upright on the outer wall surface 31 of the panel member 30.

As shown in FIG. 2, as viewed inwardly from the outside of the vehicle 1, the second screen portion 16 is formed to have a fan-shaped annular cross section along the outer periphery of the second transmitter 14. Specifically, an inner side surface 161 of the second screen portion 16 facing the second receptacle 12 has an arc shape following the shape of the second filling nozzle 24 that is to be coupled to the second receptacle 12. The distance between the inner side surface 161 and the second receptacle 12 is set so as not to hinder the insertion of the second filling nozzle 24 when coupling the second filling nozzle 24 to the second receptacle 12. In addition, an outer side surface 162 opposite to the inner side surface 161 also has an arc shape. It should be noted that the shape of the second screen portion 16 is not limited to the fan-shaped annular cross section, and may be, for example, a crescent-shaped cross section.

In addition, as shown in FIG. 3, the end of the of the second screen portion 16 projects farther than the end of the second transmitter 14 in the projection direction of the second screen portion 16. Here, in the projection direction of the second screen portion 16, the end of the second screen portion 16 may project farther than a straight line L2 connecting the end of the second transmitter 14 and the first receiver 25 of the first filling nozzle 23 in a state of being coupled to the first receptacle 11. More specifically, the straight line L2 is a line connecting the center of the end of the second transmitter 14 and the center of the first receiver 25 in a state where the first receptacle 11 and the first filling nozzle 23 are coupled to each other, for example.

In the present embodiment, the inner side surface 151 of the first screen portion 15 facing the first receptacle 11 and the inner side surface 161 of the second screen portion 16 facing the second receptacle 12 are each covered with resin. For example, a part of the first screen portion 15 including the inner side surface 151 is made of resin material and the other part is made of metal material. Similarly, a part of the second screen portion 16 including the inner side surface 161 is made of resin material and the other part is made of metal material. Examples of the resin material include, polypropylene (PP), polyamide (PA), polyethylene terephthalate (PET), polyphenylene sulfide (PPS), polyethylene naphthalate (PEN), epoxy resin, and the like. Examples of the metal material include iron, aluminum, and the like.

Furthermore, the filling module 10 of the present embodiment includes a first cap 17 detachably attached to the first receptacle 11 and a second cap 18 detachably attached to the second receptacle 12. The first cap 17 is connected to one end of a string-like member 32. The other end of the string-like member 32 is securely screwed onto the outer wall surface 31 of the panel member 30, for example. Similarly, the second cap 18 is connected to one end of a string-like member 33. The other end of the string-like member 33 is securely screwed onto the outer wall surface 31 of the panel member 30, for example.

In the present embodiment, since the first receptacle 11 and the second receptacle 12 have the same shape and size, the first cap 17 and the second cap 18 also have the same shape and size. It should be noted that the first receptacle 11 and the second receptacle 12 may have difference shapes. In this case, the first cap 17 and the second cap 18 also have different shapes.

Then, the closest distance between the first screen portion 15 and the second screen portion 16 is smaller than the outside diameter of the first cap 17 and the outside diameter of the second cap 18. The closest distance between the first screen portion 15 and the second screen portion 16 is equal to the smallest distance between the outer side surface 152 of the first screen portion 15 and the outer side surface 162 of the second screen portion 16.

With such a configuration, since the first cap 17 or the second cap 18 can be placed on a clearance generated between the first screen portion 15 and the second screen portion 16, it is possible to ensure a space for placement of the first cap 17 or the second cap 18. Accordingly, as shown in FIG. 2, for example, among the first cap 17 detached from the first receptacle 11 and the second cap 18 detached from the second receptacle 12, the second cap 18 can be placed on the space provided in the filling lid box as conventionally, and the first cap 17 can be placed on the clearance generated between the first screen portion 15 and the second screen portion 16. Consequently, it is possible to prevent the first cap 17 or the second cap 18 with no placement space from interfering with the vehicle body, and to reduce the likelihood that the first cap 17 or the second cap 18 with no placement space will hinder the coupling of the filling nozzle to the receptacle.

It should be noted that when the first cap 17 is placed on the clearance generated between the first screen portion 15 and the second screen portion 16, the string-like member 32 connected to the first cap 17 may pass above the first receptacle 11 and the first screen portion 15 (see FIG. 2), or the string-like member 32 may pass through the clearance between the first screen portion 15 and the second screen portion 16.

In the filling module 10 of the present embodiment, the first screen portion 15 projects toward the gas station 2 and its end projects farther than the end of the first transmitter 13. The first screen portion 15 can prevent the infrared rays transmitted by the first transmitter 13 provided near the first receptacle 11 from entering the second receiver 26 on the end portion of the second filling nozzle 24 coupled to the second receptacle 12. Meanwhile, the second screen portion 16 projects toward the gas station 2 and its end projects farther than the end of the second transmitter 14. The second screen portion 16 can prevent the infrared rays transmitted by the second transmitter 14 provided near the second receptacle 12 from entering the first receiver 25 on the end portion of the first filling nozzle 23 coupled to the first receptacle 11. Consequently, even when the first receptacle 11 and the second receptacle 12 are disposed adjacent to each other, interference can be avoided.

Additionally, in the projection direction of the first screen portion 15, the end of the first screen portion 15 projects farther than the straight line L1 connecting the end of the first transmitter 13 and the second receiver 26 of the second filling nozzle 24 in a state of being coupled to the second receptacle 12. With such a configuration, it is possible to more surely prevent the infrared rays transmitted by the first transmitter 13 from entering the second receiver 26 on the end portion of the second filling nozzle 24 coupled to the second receptacle 12 and increase the effect of preventing interference. Similarly, in the projection direction of the second screen portion 16, the end of the second screen portion 16 projects farther than the straight line L2 connecting the end of the second transmitter 14 and the first receiver 25 of the first filling nozzle 23 in a state of being coupled to the first receptacle 11. Accordingly, it is possible to more surely prevent the infrared rays transmitted by the second transmitter 14 from entering the first receiver 25 on the end portion of the first filling nozzle 23 coupled to the first receptacle 11 and increase the effect of preventing interference.

In addition, the inner side surface 151 of the first screen portion 15 facing the first receptacle 11 has an arc shape following the shape of the first filling nozzle 23 that is to be coupled to the first receptacle 11. Since the first screen portion 15 guides the first filling nozzle 23 using the arc-shaped inner side surface 151, it is possible to more smoothly couple the first filling nozzle 23 to the first receptacle 11 and to prevent the first filling nozzle 23 from interfering with the second receptacle 12 adjacent to the first receptacle 11. Similarly, the inner side surface 161 of the second screen portion 16 facing the second receptacle 12 has an arc shape following the shape of the second filling nozzle 24 that is to be coupled to the second receptacle 12. Since the second screen portion 16 guides the second filling nozzle 24 using the arc-shaped inner side surface 161, it is possible to more smoothly couple the second filling nozzle 24 to the second receptacle 12 and to prevent the second filling nozzle 24 from interfering with the first receptacle 11 adjacent to the second receptacle 12.

Furthermore, the inner side surface 151 of the first screen portion 15 facing the first receptacle 11 and the inner side surface 161 of the second screen portion 16 facing the second receptacle 12 are each covered with resin. With such a configuration, even if the first filling nozzle 23 comes into contact with the first screen portion 15 and the second filling nozzle 24 comes into contact with the second screen portion 16 during coupling operation, it is possible to reduce damage to the first filling nozzle 23 or the second filling nozzle 24 caused by such contact.

In addition, according to the vehicle 1 provided with the filling module 10 with the above-stated structure, since interference can be avoided, it is possible to more accurately conduct the fuel gas filling operation in a shorter time.

Second Embodiment

Hereinafter, a second embodiment of the filling module will be described referring to FIG. 4. A filling module 10A of the present embodiment is different from the foregoing first embodiment in that the filling module 10A includes one screen portion. The following describes only a difference from the first embodiment.

Figure 4:
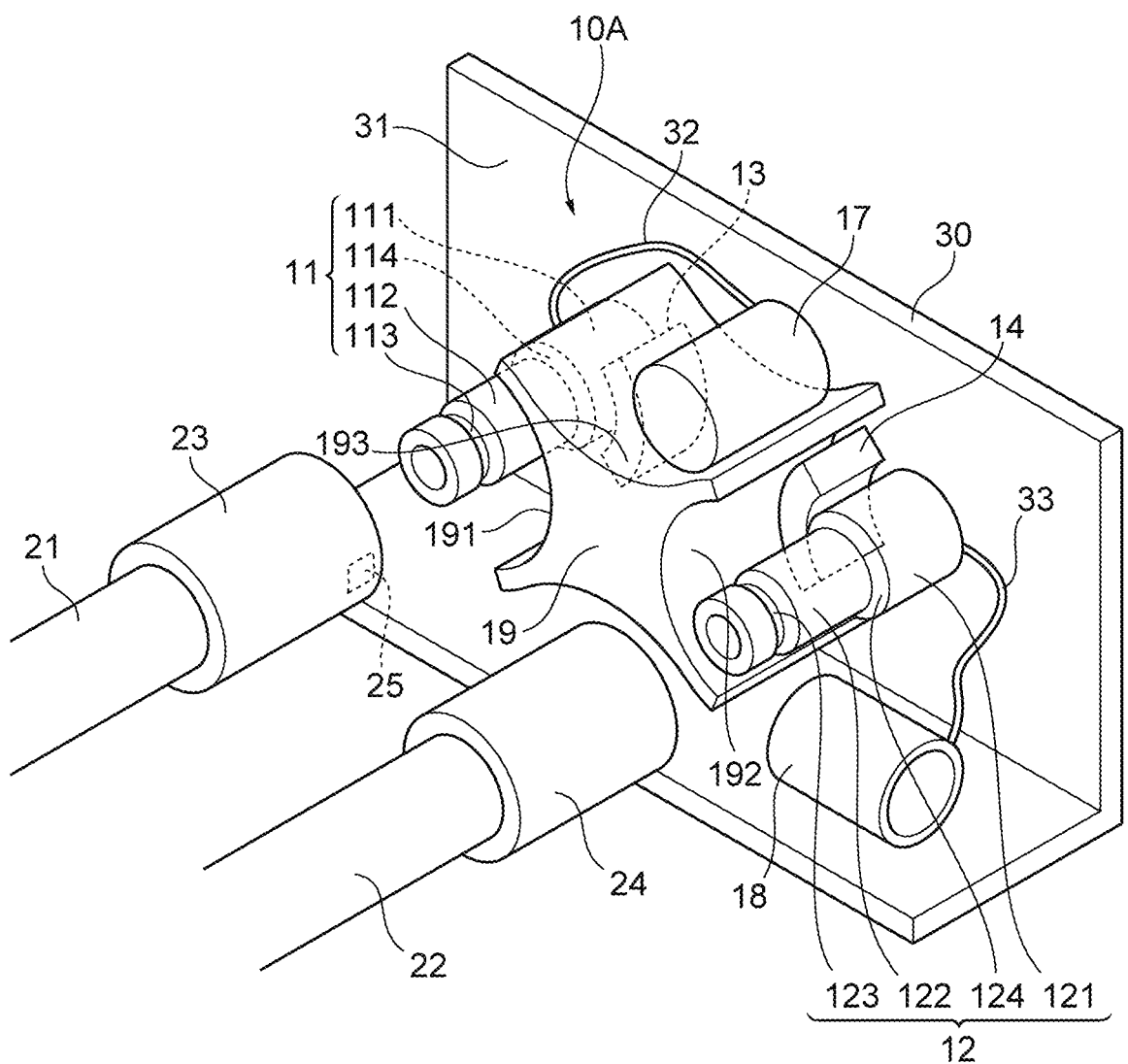
FIG. 4 is a perspective view of a filling module according to a second embodiment.

As shown in FIG. 4, one screen portion 19 projecting outwardly of the vehicle 1 (toward the gas station 2) is provided between the first transmitter 13 and the second transmitter 14. The screen portion 19 is disposed at the center between the first transmitter 13 and the second transmitter 14, and projects upright from the outer wall surface 31 of the panel member 30. In the projection direction of the screen portion 19, the end of the screen portion 19 may project farther than the end of at least one of the first transmitter 13 or the second transmitter 14. However, since the first transmitter 13 and the second transmitter 14 of the present embodiment have the same projection length, the end of the screen portion 19 projects farther than the end of the first transmitter 13 and the end of the second transmitter 14. In addition, the end of the screen portion 19 projects farther than the straight line L1 connecting the end of the first transmitter 13 and the second receiver 26 of the second filling nozzle 24 in a state of being coupled to the second receptacle 12, for example (see FIG. 3).

A first side surface 191 of the screen portion 19 facing the first receptacle 11 has an arc shape following the shape of the first filling nozzle 23 that is to be coupled to the first receptacle 11. The distance between the first side surface 191 and the first receptacle 11 is set so as not to hinder the insertion of the first filling nozzle 23 when coupling the first filling nozzle 23 to the first receptacle 11.

In addition, a second side surface 192 of the screen portion 19 facing the second receptacle 12 has an arc shape following the shape of the second filling nozzle 24 that is to be coupled to the second receptacle 12. The distance between the second side surface 192 and the second receptacle 12 is set so as not to hinder the insertion of the second filling nozzle 24 when coupling the second filling nozzle 24 to the second receptacle 12.

As shown in FIG. 4, a top surface 193 of the screen portion 19 is recessed to place the first cap 17 or the second cap 18 thereon. That is, the top surface 193 may serve as a space for placement of the first cap 17 or the second cap 18.

Then, the first side surface 191 of the screen portion 19 facing the first receptacle 11 and the second side surface 192 of the screen portion 19 facing the second receptacle 12 are each covered with resin. For example, a part of the screen portion 19 including the first side surface 191 and a part of the screen portion 19 including the second side surface 192 are each made of resin material and the other part is made of metal material.

In the filling module 10A of the present embodiment, the first side surface 191 of the screen portion 19 facing the first receptacle 11 has an arc shape following the shape of the first filling nozzle 23 that is to be coupled to the first receptacle 11. Since the screen portion 19 guides the first filling nozzle 23 using the first side surface 191, it is possible to more smoothly couple the first filling nozzle 23 to the first receptacle 11 and to prevent the first filling nozzle 23 from interfering with the second receptacle 12 adjacent to the first receptacle 11. Meanwhile, the second side surface 192 of the screen portion 19 facing the second receptacle 12 has an arc shape following the shape of the second filling nozzle 24 that is to be coupled to the second receptacle 12. Since the screen portion 19 guides the second filling nozzle 24 using the second side surface 192, it is possible to more smoothly couple the second filling nozzle 24 to the second receptacle 12 and to prevent the second filling nozzle 24 from interfering with the first receptacle 11 adjacent to the second receptacle 12.

In the foregoing first embodiment, the example of disposing the transmitter transmitting the infrared rays on the filling module 10 side and disposing the receiver receiving the infrared rays on the filling nozzle side of the gas station 2 has been described. However, the positions of the transmitter and the receiver may be replaced, that is, the transmitter may be disposed on the filling nozzle side of the gas station 2 and the receiver may be disposed on the filling module 10 side.

For example, the first transmitter transmitting the infrared rays is disposed on the end portion of the first filling nozzle 23 and the second transmitter transmitting the infrared rays is disposed on the end portion of the second filling nozzle 24. Each of these transmitters is embedded in the end portion of the filling nozzle such that its end surface is flush with the end surface of the filling nozzle. Meanwhile, the first receiver for receiving the infrared rays transmitted by the first transmitter is disposed near the first receptacle 11 and the second receiver for receiving the infrared rays transmitted by the second transmitter is disposed near the second receptacle 12.

In this case, the first screen portion 15 is disposed between the first receiver and the second receiver at a location close to the first receiver and projects toward the gas station 2 such that the infrared rays transmitted by the second transmitter on the second filling nozzle 24 side will not enter the first receiver disposed near the first receptacle 11. Then, in the projection direction of the first screen portion 15, the end of the first screen portion 15 projects farther than the end of the first receiver. The end of the first screen portion 15 may project farther than the straight line connecting the end of the first receiver and the second transmitter of the second filling nozzle 24 in a state of being coupled to the second receptacle 12.

Similarly, the second screen portion 16 is disposed between the first receiver and the second receiver at a location close to the second receiver and projects toward the gas station 2 such that the infrared rays transmitted by the first transmitter on the first filling nozzle 23 side will not enter the second receiver disposed near the second receptacle 12. Then, in the projection direction of the second screen portion 16, the end of the second screen portion 16 projects farther than the end of the second receiver. The end of the second screen portion 16 may project farther than the straight line connecting the end of the second receiver and the first transmitter of the first filling nozzle 23 in a state of being coupled to the first receptacle 11.

With such a configuration, the same effect as that in the first embodiment can be obtained. That is, even when the first receptacle 11 and the second receptacle 12 are disposed adjacent to each other, interference can be avoided.

In addition, in the above-stated second embodiment, the transmitter may be disposed on the filling nozzle side of the gas station 2 and the receiver may be disposed on the filling module 10 side. Also in such a case, the same effect as that in the second embodiment can be obtained.

Although the embodiments of the present disclosure have been described in detail above, the present disclosure is not limited to the above embodiments, and various design changes are possible in so far as they are within the spirit of the present disclosure in the scope of the claims.

What is claimed is:

1. A filling module for filling a tank with fuel gas, comprising:
   a first receptacle configured to be coupled to a first filling nozzle disposed on a gas station side;
   a second receptacle configured to be coupled to a second filling nozzle disposed on the gas station side, the second receptacle being adjacent to the first receptacle;
   a first transmitter configured to transmit infrared rays to a first receiver disposed on an end portion of the first filling nozzle, the first transmitter being provided near the first receptacle;
   a second transmitter configured to transmit infrared rays to a second receiver disposed on an end portion of the second filling nozzle, the second transmitter being provided near the second receptacle; and
   a screen portion that projects toward the gas station, the screen portion being provided between the first transmitter and the second transmitter,
   wherein in the projection direction of the screen portion, an end of the screen portion projects farther than an end of at least one of the first transmitter or the second transmitter.

2. The filling module according to claim 1, wherein in the projection direction of the screen portion, the end of the screen portion projects farther than a straight line connecting the end of the first transmitter and the second receiver of the second filling nozzle in a state of being coupled to the second receptacle or a straight line connecting the end of the second transmitter and the first receiver of the first filling nozzle in a state of being coupled to the first receptacle.

3. The filling module according to claim 1, wherein:
   the screen portion includes a first screen portion located relatively close to the first receptacle and a second screen portion located relatively close to the second receptacle, and when the first filling nozzle and the second filling nozzle are each formed in a cylindrical shape having a filling passage at the center of the first filling nozzle and the center of the second filling nozzle, a side surface of the first screen portion facing the first receptacle has an arc shape following the shape of the first filling nozzle and a side surface of the second screen portion facing the second receptacle has an arc shape following the shape of the second filling nozzle.

4. The filling module according to claim 3, further comprising a first cap detachably attached to the first receptacle and a second cap detachably attached to the second receptacle,
wherein the closest distance between the first screen portion and the second screen portion is smaller than an outside diameter of the first cap and an outside diameter of the second cap.

5. The filling module according to claim 3, wherein the side surface having an arc shape of the first screen portion facing the first receptacle and the side surface having an arc shape of the second screen portion facing the second receptacle are each covered with resin.

6. The filling module according to claim 1, wherein:
the screen portion includes one screen portion, and
when the first filling nozzle and the second filling nozzle are each formed in a cylindrical shape having a filling passage at the center of the first filling nozzle and the center of the second filling nozzle, a side surface of the screen portion facing the first receptacle has an arc shape following the shape of the first filling nozzle and a side surface of the screen portion facing the second receptacle has an arc shape following the shape of the second filling nozzle.

7. A filling module for filling a tank with fuel gas, comprising:
a first receptacle configured to be coupled to a first filling nozzle disposed on a gas station side;
a second receptacle configured to be coupled to a second filling nozzle disposed on the gas station side, the second receptacle being adjacent to the first receptacle;
a first receiver configured to receive infrared rays transmitted by a first transmitter disposed on an end portion of the first filling nozzle, the first receiver being provided near the first receptacle;
a second receiver configured to receive infrared rays transmitted by a second transmitter disposed on an end portion of the second filling nozzle, the second receiver being provided near the second receptacle; and
a screen portion that projects toward the gas station, the screen portion being provided between the first receiver and the second receiver,
wherein in the projection direction of the screen portion, an end of the screen portion projects farther than an end of at least one of the first receiver or the second receiver.

8. A vehicle comprising the filling module according to claim 1.

9. A vehicle comprising the filling module according to claim 7.

* * * * *